United States Patent [19]

Slana et al.

[11] 4,160,127
[45] Jul. 3, 1979

[54] TIME-SLOT INTERCHANGE WITH PROTECTION SWITCHING

[75] Inventors: Matthew F. Slana, Naperville, Ill.; Henry E. Vaughan, deceased, late of Whispering Pine, N.C., by Emily Heiland Vaughan, executrix

[73] Assignee: Bell Telephone Laboratories, Incorporated, Murray Hill, N.J.

[21] Appl. No.: 919,444

[22] Filed: Jun. 27, 1978

[51] Int. Cl.² ............................................. H04J 3/00
[52] U.S. Cl. ........................... 179/15 AQ; 179/15 BF
[58] Field of Search ....................... 179/15 AQ, 15 BF

[56] References Cited

U.S. PATENT DOCUMENTS

| | | | |
|---|---|---|---|
| 3,886,318 | 5/1975 | Charransol et al. | 179/15 BF |
| 3,959,596 | 5/1976 | Bojanek et al. | 179/15 AT |
| 4,074,072 | 2/1978 | Christensen et al. | 179/15 AQ |

Primary Examiner—Thomas W. Brown
Attorney, Agent, or Firm—Peter Visserman

[57] ABSTRACT

Time-slot interchange circuitry for use in a time-division switching system is disclosed having n+1 input interface units and n+1 output interface units to serve n PCM lines. One of each group of n+1 interface units is designated a spare unit and control circuitry is disclosed for autonomously channeling incoming data words or outgoing data words through a spare unit and for autonomously altering the control for the spare unit in the event of failure of a unit in service.

9 Claims, 11 Drawing Figures

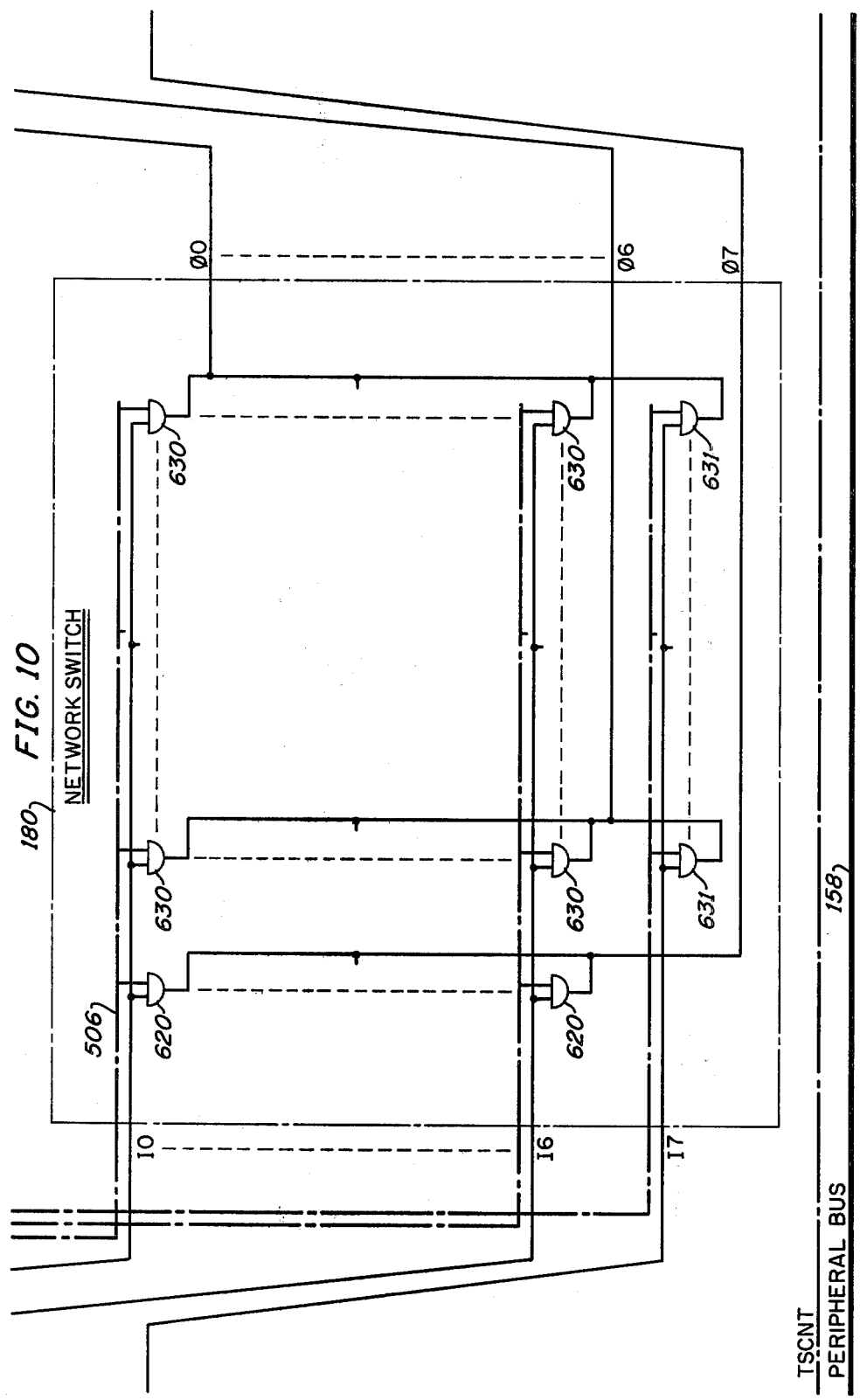

TIME-SLOT INTERCHANGE WITH PROTECTION SWITCHING

TECHNICAL FIELD

The invention relates to a time-division communication switching system, and more particularly, to such a system having a plurality of interface circuits, having buffer memories for temporarily storing PCM data words representing speech segments and control memories for controlling the transfer of data words through the interface circuits.

BACKGROUND OF THE INVENTION

A time-division telephone switching system employing a time-shared space division network and interface circuits having input and output buffer memories and control memories is disclosed in U.S. Pat. No. 3,736,381 of Johnson et al. In order to attain the desired degree of reliability in an independently operating telephone switching system, it is common practice to duplicate the system's critical hardware and to operate such hardware in parallel. Customarily, such hardware is designated to be either in the "active" or "stand-by" mode and only the output information produced by the active units of the system is recognized as the system's output. In the event that an error is detected in an active unit, the roles of the two units are switched such that the unit which was the stand-by unit becomes the active unit. In normal operation, both units will contain the same data and control information due to continuous updates of both units. Thus, a switch of the equipment from active to stand-by can be made without significant time delay or loss of information. Such duplication of equipment, while reliable, adds significantly to the cost of the system and an arrangement of equivalent reliability but requiring less than full duplication is desirable. Systems, such as multiprocessor configurations, have been suggested in the prior art which employ several "active" and one "stand-by" or spare unit to be called into operation in event of failure of one of the "active" units. Generally, such arrangements are not satisfactory in real time communications switching systems since a significant loss of data may result during the time required to activate a spare unit, particularly since control information which changes in time must be transferred to the spare unit.

In time-division switching systems such as described in the aforementioned Johnson et al., patent, PCM data words representing speech samples are received from a time-division transmission line in serial form, buffered and switched through a network in serial form. In another prior art arrangement disclosed in British Pat. No. 1,349,823, the data words are switched simultaneously in parallel paths. For example, an eight-bit word will simultaneously occupy eight switching paths, one switching path for each bit. For reliability, one additional path is provided for each eight-bit word which may be used as a spare path in the event of failure of one of the eight other paths. Such a parallel switching arrangement, however, is too costly to be practical in any large capacity switching system.

SUMMARY OF THE INVENTION

In accordance with this invention, communication lines connected to a time-division switching system and their associated line interface circuits are divided into groups and a spare line interface circuit is provided for each group of lines. Error detection circuit is provided for detecting faults in the line interface units and for generating error signals which identify a particular unit in which a fault has occurred. Circuitry is provided which is responsive to the error signals to divert data from a line connected to a faulty unit to the spare unit and further to control the network to establish paths to the spare unit in place of the faulty unit.

In one embodiment of the invention each time-division line is provided with an input interface unit connected to the input side of the switching network and an output interface unit connected to the output side of the switching network. Each input interface unit is adapted to convert an incoming serial stream of data bits into data words each having several bits, and to temporarily store the data words. In the illustrative time-division telephone switching system described herein, each of these data words represents a segment of encoded speech which is transferred from an input interface unit through a time-shared space division network to an output time-slot interface unit, under control of time-slot memories. At the output time-slot interchange unit data words are multiplexed into a serial data stream for transmission on an outgoing time-division multiplex line.

Error detection circuitry is provided in each interface unit and when an error is detected in an active unit, an error signal is generated unique to the faulty unit. The error signal is used to activate a transfer control circuit which operates to divert further incoming data from the faulty unit to the spare unit. Thereafter, such incoming PCM data words will be channeled through the spare unit to the network terminal to which the spare unit memory is connected. The transfer control circuit, activated by the error signal, also alters the information in the slot memories to effect a change in network connection. In accordance with this invention such alteration is accomplished by means of autonomous control circuitry and without affecting the systems other call handling functions. Furthermore, the change of equipment is accomplished without significant loss of encoded speech.

In one illustrative time-division switching system, such as described in the aforementioned Johnson et al., patent, a data stream comprises 128 PCM channels; a network cycle is divided in 128 time slots and the switching network is reconfigured 128 times in each cycle. In that system, the time-slot memories which contain the information used to control the transfer of data words to and through the network have 128 entries. To alter the path of data through the network in the event of failure of an interface unit, 128 time-slot memory entries have to be altered. To modify all 128 entries under control of the system's central processor would require a substantial amount of real time, resulting in the loss of a significant amount of the data being switched by the system. Furthermore, the processor time required for such a transfer tends to interrupt and take away from the normal call-handling operations of the central processor. Advantageously, in accordance with this invention, circuitry is provided for autonomously altering the time-slot information of an entire memory within one network cycle. Since in each network cycle at most one speech sample from each of a plurality of voice frequency lines is transferred through the network, the one network cycle period required for altering time-slot memory information will result in the loss of at most one speech sample of any conversation being switched through the network. In ordinary voice conversation, the loss of one such segment will go unnoticed.

The above-noted features of this invention are illustrated in the following description in which reference is made to the figures of the accompanying drawing.

BRIEF DESCRIPTION OF THE DRAWING

FIG. 10 shows a network switch; and

FIG. 11 is a composite showing the relationship between FIGS. 2 through 10.

DETAILED DESCRIPTION

Figure 1:
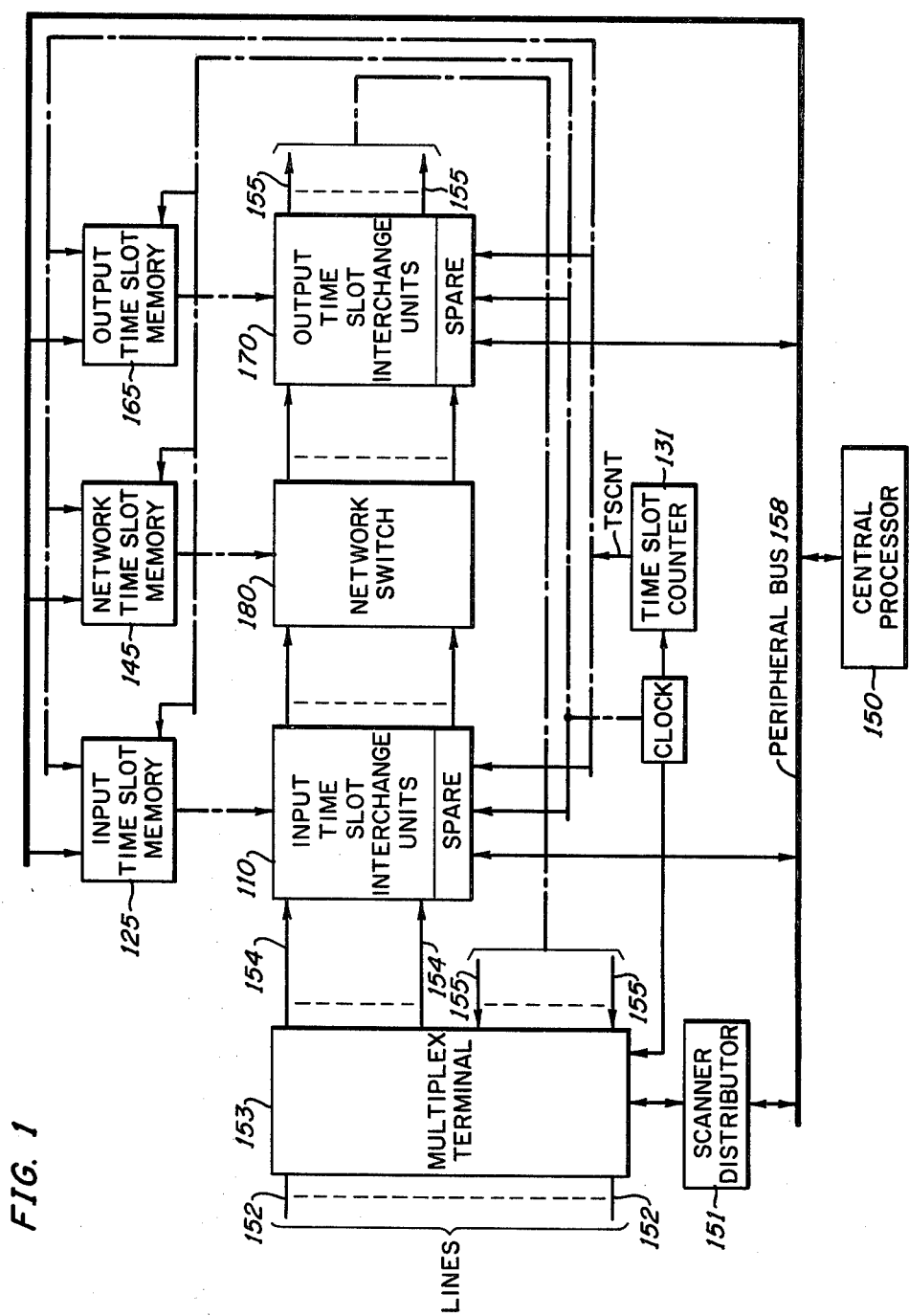
FIG. 1 shows a time-division switching system having input and output time-slot interchange units, including spare units.

With reference to the drawing, FIG. 1 is a representation of a time-division switching system similar to that disclosed in the aforementioned Johnson et al. patent. Such a system may comprise a multiplex terminal 153 for multiplexing information from a plurality of communication lines 152 onto time-division path, and vice versa, in a well-known manner. In the illustrative system input information from 128 communication lines, such as the lines 152, may be multiplexed onto a single time-division path 154. A group of such time-division paths 154 are connected to input time-slot interchange units which, in turn, are connected to a network switch 180. The output terminals of the network switch 180 are connected to output time-slot interchange units 170, and output signals of the time-slot interchange units 170 are transmitted to the multiplex terminal 153 by means of time-division communication paths 155.

A central processor 150 controls the operation of the system through access to the various units of the system by means of peripheral bus 158. The processor 150 may, for example, be similar to the 1A Processor described in *The Bell System Technical Journal,* Vol. 56, No. 2, pages 119 through 312, February, 1977. By means of a combined scanner and signal distributor unit 151, the functions of which are well-known in the telephony art, the central processor 150 detects the operational state of the communication lines connected to the system and controls the multiplex terminal 153. The time-slot interchange units 110 and 170 and the network 180 are controlled by means of time-slot memories 125, 165, and 145, respectively. The time-slot memories receive the control information from the central processor 150 via the peripheral bus 158. The system further comprises a system clock 130 and a time-slot counter 131. Together these units provide the necessary timing for the system, in a manner that is well-known in the art. In this illustrative system, each system time cycle or time frame is divided into 128 time slots. In this system the time-slot counter 131 is an eight-bit binary counter adapted to count from 0 to 255. By means of such a counter the various circuits of the system may receive up to two pulses per time slot.

A communication switching system generally employing the principles set forth herein is disclosed in the September, 1977, issue of *The Bell System Technical Journal,* Vol. 56, No. 7, pages 1015 through 1320.

Figure 2:
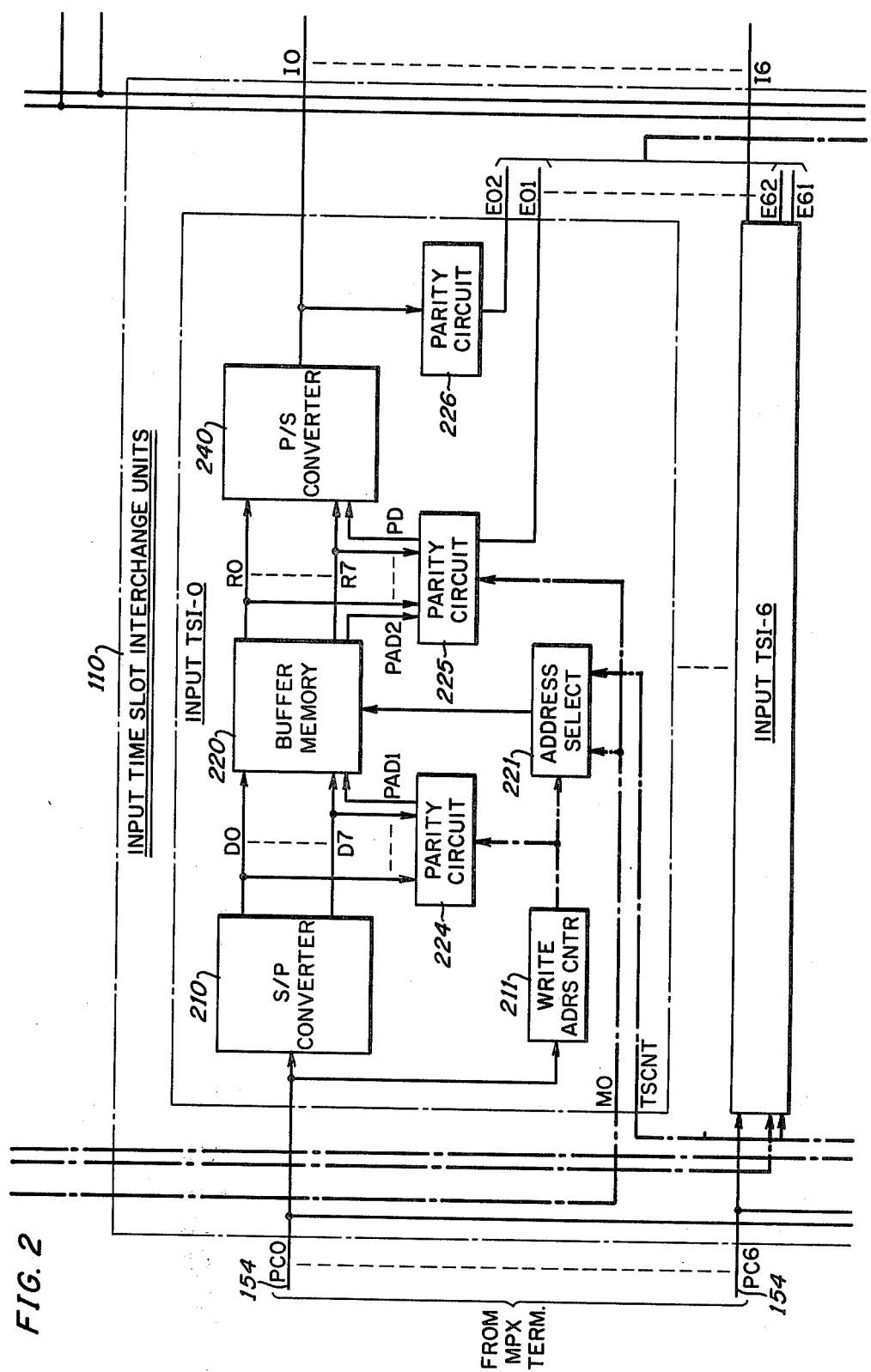
FIG. 2 illustrates a group of time-slot interface circuits.
Figure 3:
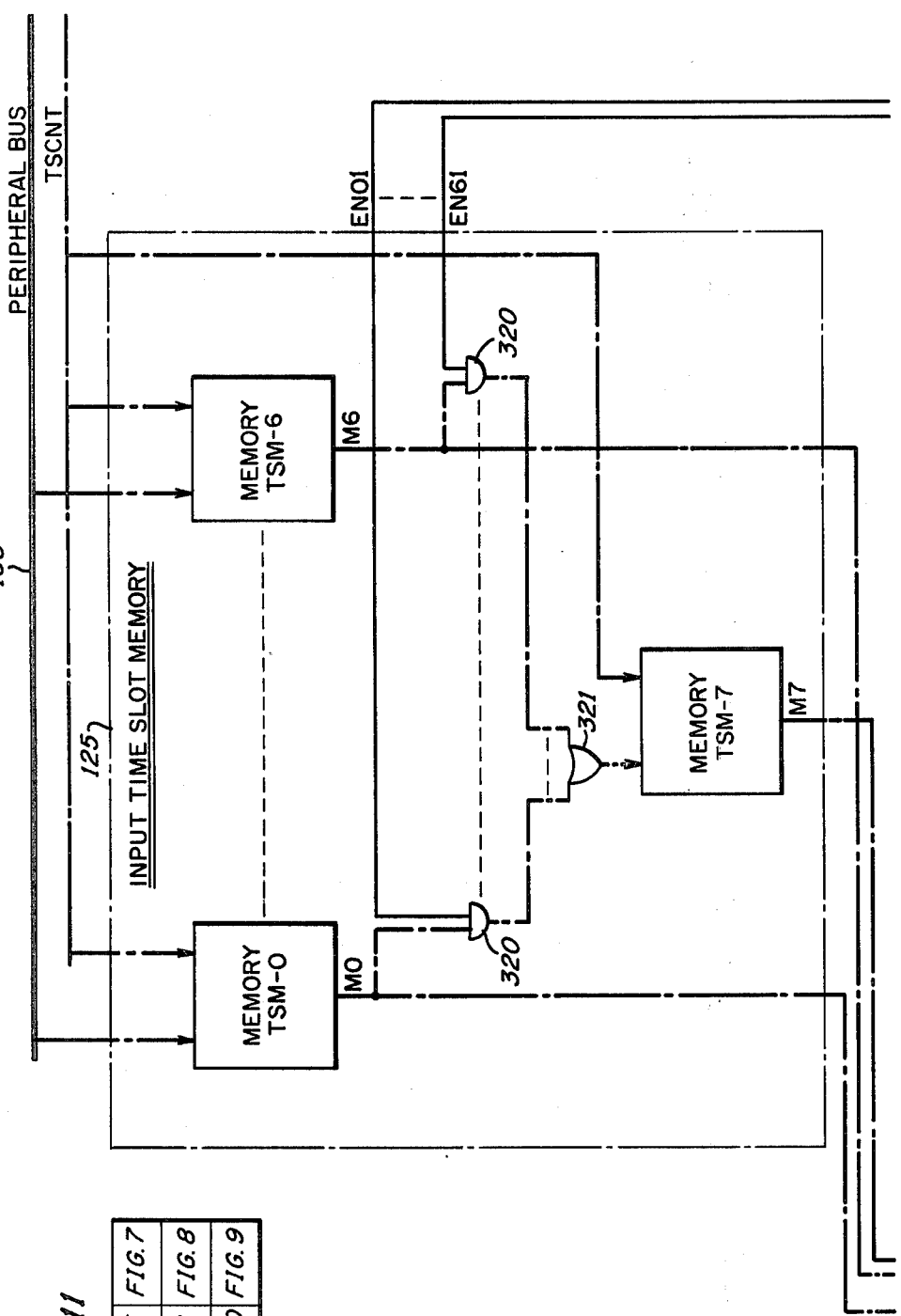
FIG. 3 depicts time-slot memories for storing control information for input time-slot interchange units.

FIG. 2 represents an affiliated group of seven input time-slot interchange units, TSI-0 through TSI-6. A spare unit, TSI-7, is shown in FIG. 3. The units TSI-0 through TSI-6 are identical in structure and, hence, only one of these units namely TSI-0, will be described herein. TSI-7 incorporates additional gating circuits and will be described in subsequent paragraphs. Under normal operation units TSI-0 through TSI-6 will be activated to handle input data and the spare unit will be idle. This particular group of seven affiliated units and one spare unit have been selected for illustrative purposes and it is envisioned that a large switching system will have a plurality of such groups and that the size of the groups may vary depending upon the system requirements.

Input conductors PC-0 through PC-6 represent seven of the conductors 154 shown in FIG. 1. As shown in FIG. 2, input conductor PC-0 is connected to a serial-to-parallel converter circuit 210 which changes the serial stream of the data bits into a series of data words each having eight bits. The eight-bit words are presented in parallel on the conductors D0 through D7 which connect the circuit 210 to a buffer memory 220. The conductor PC-0 is also connected to a write address counter 211 which generates a next sequential address for the buffer memory 220 each time after eight serial data bits have been received from the conductor PC-0. The generated address is applied to the buffer memory 220 by means of the address select circuit 221 and one of the data words appearing in parallel on the conductors D0 through D7 is written in the buffer memory each time a new write address is applied.

A time-slot memory is provided for each input time-slot interchange unit. Eight time-slot memories TSM-0 through TSM-7, shown in FIG. 3, correspond to time-slot units TSI-0 through TSI-7, respectively. Each time-slot memory contains a plurality of data words, each representing a buffer memory read address. From each of the time-slot memories, one of these addresses is transmitted to the corresponding time-slot interchange unit, once during each time-slot time period. Such address is applied to the memory 220 by means of the address select circuit 221.

The address select circuit 221 is responsive to signals from the time-slot counter 131 occurring on conductor TSCNT to apply write and read control signals and write and read addresses to the buffer memory 220. The time-slot counter 131 provides two signals during each time-slot period, as discussed earlier herein, defining a first half and a second half for each time slot. The address select circuit 221 is activated during the first half cycle of the time-slot period to apply a write address and corresponding write control signals to the buffer memory 220 and is activated during the second half cycle of the time-slot period to apply a read address and corresponding read control signals to the buffer memory 220.

Parity circuits 224, 225, and 226 are provided to generate parity and to detect parity errors. Circuits of this type are well-known in the art. The parity circuit 224 receives the eight parallel data bits occurring on conductors D0 through D7 and the write address, and generates a parity bit over the combined address and data word. When the write signal and address are applied to the buffer memory 220 by means of the address select circuit 221, the buffer memory stores the eight-bit data word occurring on the conductors D0 through D7 together with the parity bit generated by the parity circuit 224 on the conductor PAD1. When the buffer memory 220 is read, an eight-bit data word is transmitted to the parallel-to-serial converter 240 and applied to parity circuit 225. Additionally, the stored parity bit is applied to the parity circuit 225 on conductor PAD2. The parity circuit 225 also receives the read address, via cable M0. In parity circuit 225 a new parity bit is computed over the data word memory and the read address, and compared with the parity bit received from the memory on conductor PAD2. If a mismatch occurs, an error signal will be generated on conductor E02. The parity circuit 225 also generates parity over the eight data bits separate from the address and transmits this parity bit to the parallel-to-serial converter 240 on conductor PD. The converter inserts the parity bits in a serial data stream generated from the parallel bits received from the buffer memory 220 via conductors R0 through R7. The parity circuit 226 receives the serial stream of data and parity from the conductor I0, computes parity over the data only, and compares it to the accompanying parity bit. Any mismatch will result in the generation of an error signal on conductor E02. The arrangement employing parity circuits 224, 225, and 226 is just one example of a fault detection scheme. Any number of other fault detection schemes could be used to provide error signals. A single error signal instead of two error signals as shown herein may also be adequate.

Time-slot interchange units TSI-1 through TSI-6 are equipped in a manner similar to unit TSI-0 and are adapted to generate error indications on error leads E11, E12 through E61, E62, respectively. The error leads E01, E02 through E61, E62 are connected to control circuitry shown in FIG. 4 and described in subsequent paragraphs. Additionally, the error signals are transmitted to the processor 150 via peripheral bus 158 for maintenance purposes. Advantageously, in accordance with our invention activation of a spare unit in the event of an error takes place autonomously without attention from the processor thereby avoiding any significant loss of time or data.

Figure 4:
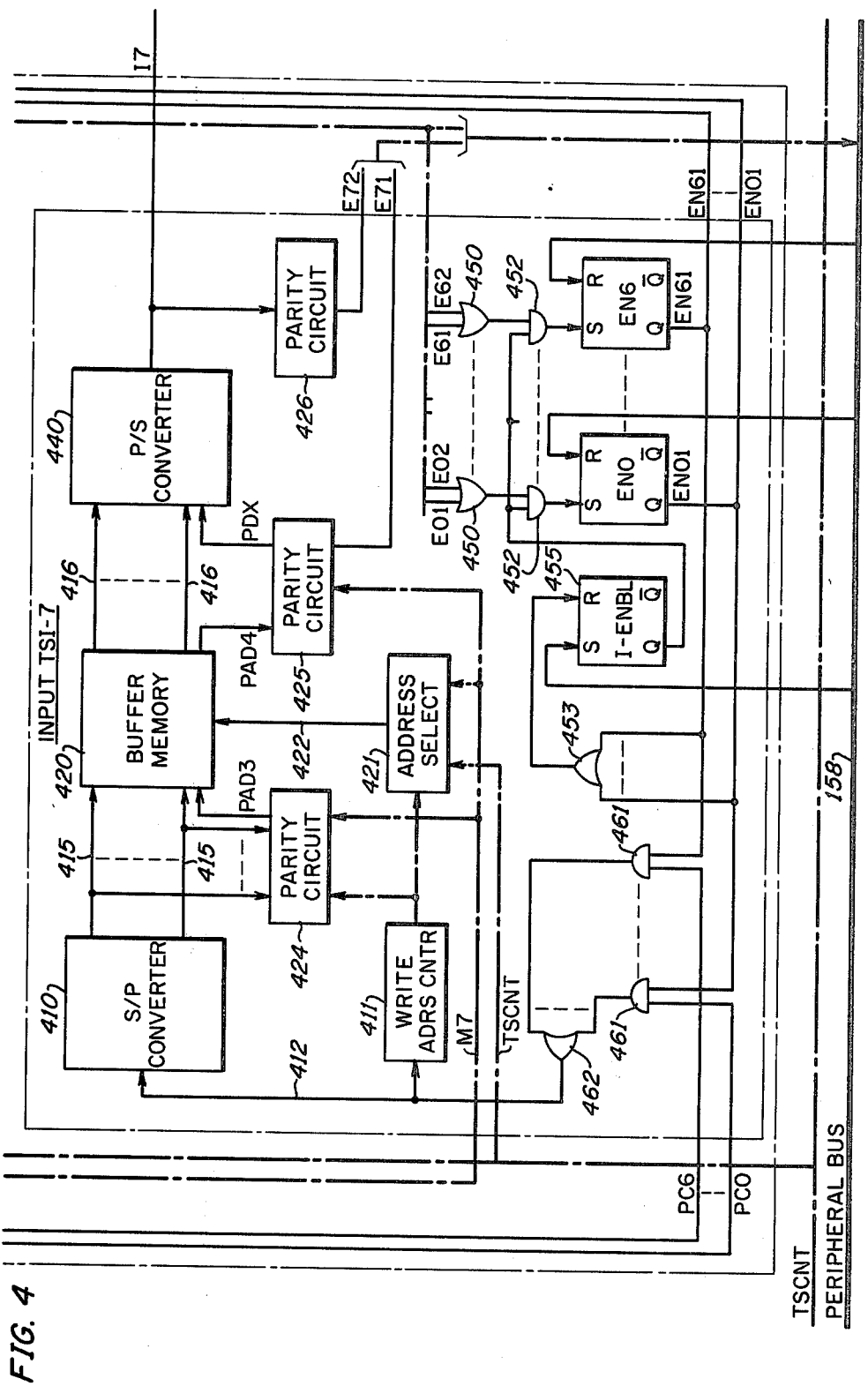
FIG. 4 depicts a spare input time-slot interchange unit in accordance with the invention, including control circuitry for activating the spare unit.

FIG. 4 represents the input time-slot interchange unit TSI-7 which is the spare unit for time-slot interchange units TSI-0 through TSI-6. TSI-7 comprises circuitry for autonomously enabling the spare unit when an error signal occurs on any of the conductors E01, E02 through E61, E62. The circuitry of FIG. 4 comprises a plurality of OR gates 450 and a plurality of AND gates 452 and a corresponding plurality of flip-flops EN0 through EN6. An error signal on any one of the error leads E01, E02 through E61, E62 will activate one of the OR gates 450 and one of the AND gates 452 to set a corresponding one of the flip-flops EN0 through EN6. For example, an error signal on conductor E61 or E62 will cause the flip-flop EN6 to be set. Similarly, an error signal on conductor E01 or E02 will result in the setting of the flip-flop EN0. The Q outputs of these two flip-flops and related flip-flops EN5 through EN1 (not shown in the drawing) are connected to OR gate 453, the output of which is used to set the input enable flip-flop 455. The output of this flip-flop is connected to AND gates 452 and used to inhibit these AND gates to prevent the setting of more than one of the flip-flops EN0 through EN6 in the event that more than one of the time-slot interchange units generates an error signal. In case it is desired to provide an alternate path in the event of multiple interface unit failures, additional spare units may be provided and enabled in a similar fashion.

Output conductors of the flip-flops EN0 through EN6, respectively, are connected to respective ones of a plurality of AND gates 461. Each of the AND gates 461 has an input terminal connected to one of the conductors PC-0 through PC-6, which conductors function to transfer serial streams of data bits from the multiplex terminal 153 to corresponding input time-slot units. The output terminals of AND gates 461 are connected to the series-to-parallel converter 410 and the write address counter 411 through OR gate 462. Thus, activation of one of the AND gates 461 by a signal on one of the conductors EN01 through EN61 causes data from the corresponding one of the conductors PC-0 through PC-6 to be transferred to the converter 410 and the write address counter 411. These last-mentioned units operate in a manner similar to the series-to-parallel converter 210 and write address counter 211 referred to earlier herein with respect to FIG. 2. Similarly, the buffer memory 420, the parallel-to-serial converter 440, the address select circuit 421 and the parity circuits 424, 425, and 426 perform the same functions as like named circuits in FIG. 2 and described with respect to that figure.

The operation of the circuitry of FIG. 4 may be further understood with reference to a specific example. By way of example, an error detected by the parity circuit 225 will produce an error signal on conductor E01 which will result in the setting of the flip-flop EN0 in FIG. 4. The setting of this flip-flop, through operation of OR gate 453 results in the setting of the enable flip-flop 455 and the inhibiting of the AND gates 452 to prevent further activation of the circuit from errors occurring in other of the related time-slot interchange units. Furthermore, setting of flip-flop EN0 will result in the enabling of one of the AND gates 461 which has as one of its inputs the conductor PC-0. After enabling of that particular AND gate, the serial stream of data bits normally occurring on the conductor PC-0 will be applied to the serial-to-parallel converter 410 and the write address counter 411 via the conductor 412. At the serial-to-parallel converter 410, the serial stream of data bits will be converted to eight-bit words which will be presented in parallel on the conductors 415 and transmitted to the buffer memory 420. Concomitantly, the write address counter 411 will present an address to the address select circuit 421, which is connected to the buffer memory 420 by means of the conductor 422, causing data words to be written into the buffer memory 420 at sequential addresses under control of signals from time-slot counter 131 on conductor TSCNT.

The output signals of the flip-flops EN0 through EN6 are also applied via conductors EN01 through EN06, respectively, to a plurality of AND gates 320, shown in FIG. 3. Each of these AND gates also has an input from one of the time-slot memories TSM-0 through TSM-6 and activation of any of the AND gates 320 causes the contents of a memory location of one of the time-slot memories occurring on the corresponding memory output conductor M0 through M6 to be gated through the activated AND gate and OR gate 321 to the time-slot memory TSM-7. During normal operation the contents of one memory location of each time-slot memory is gated onto its output conductor (e.g., M0) in every time slot under control of a signal from the time-slot counter 131 on conductor TSCNT. Thus, in one time frame of 128 time slots, the contents of one time-slot memory of a faulty unit may be transferred to the time-slot memory TSM-7.

Continuing with the example of a prior paragraph, the setting of the flip-flop EN0 results in activation of the one of the AND gates 320 to which the memory output cable M0 is connected and the information appearing thereon will be transferred in sequence under control of pulses on the conductor TSCNT, to the memory TSM-7. The contents of the time-slot memory TSM-7 will be gated to the address select circuit 421, thereby causing contents of the buffer memory 420 to be transferred via conductors 416 and the parallel-to-serial converter 440 to conductor I7. The parity circuits 424 through 426 may be provided to perform parity generation and checking functions in the same manner as described with respect to parity circuits 224 through 226 in FIG. 2. However, these parity circuits in the TSI-7 do not generate signals which result in activation of the circuitry of TSI-7. They will function only as an error indication to the central processor 150 via the peripheral bus 158. Error signals on conductors E71 and E72 are transmitted to the signal processors as well as error signals on conductors E01, E02 through E61, E62 via the peripheral bus 158.

Figure 5:
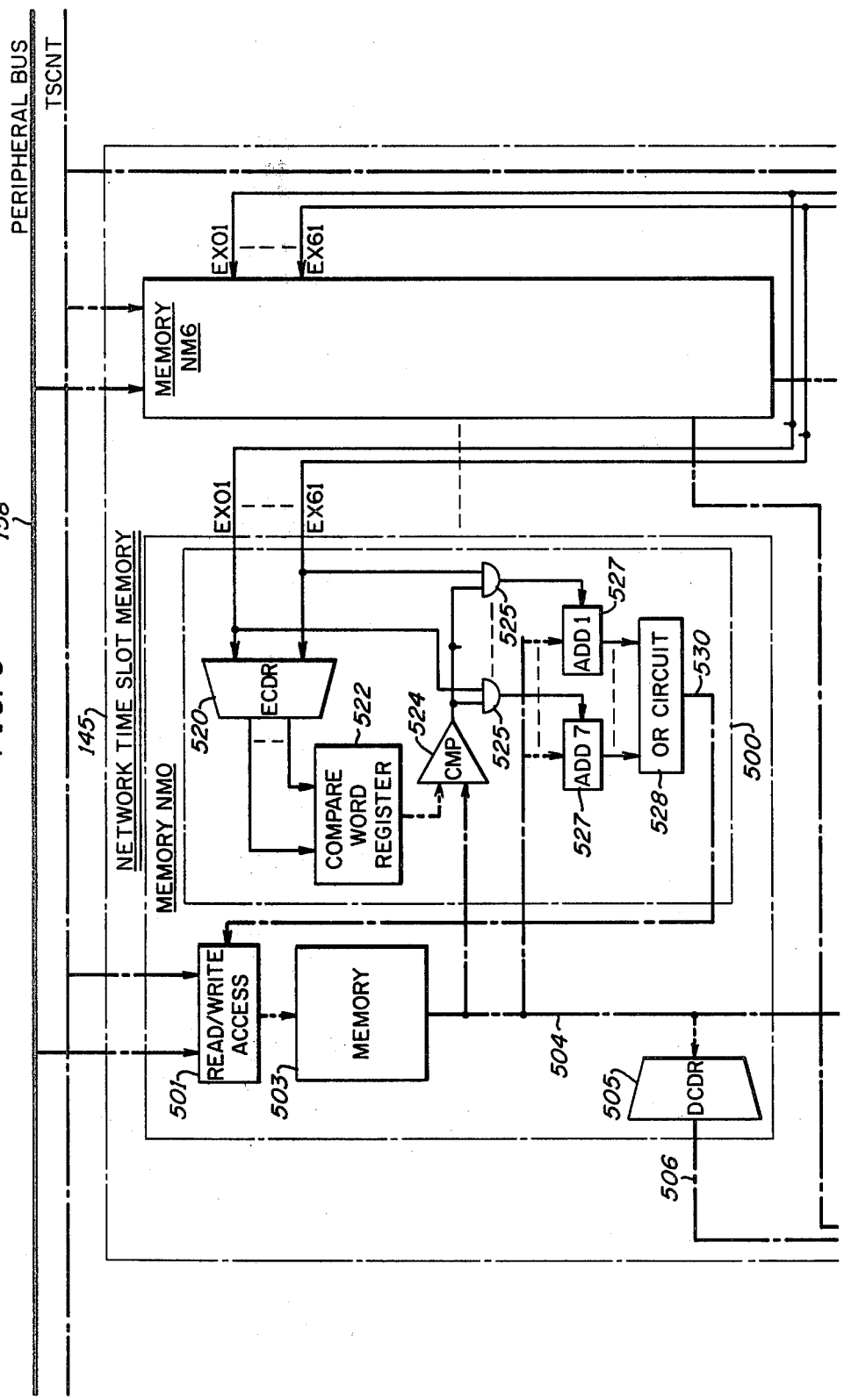
FIGS. 5 and 6 illustrate network time-slot memories for storing information to control the network switch, and including circuitry for altering memory contents.
Figure 6:
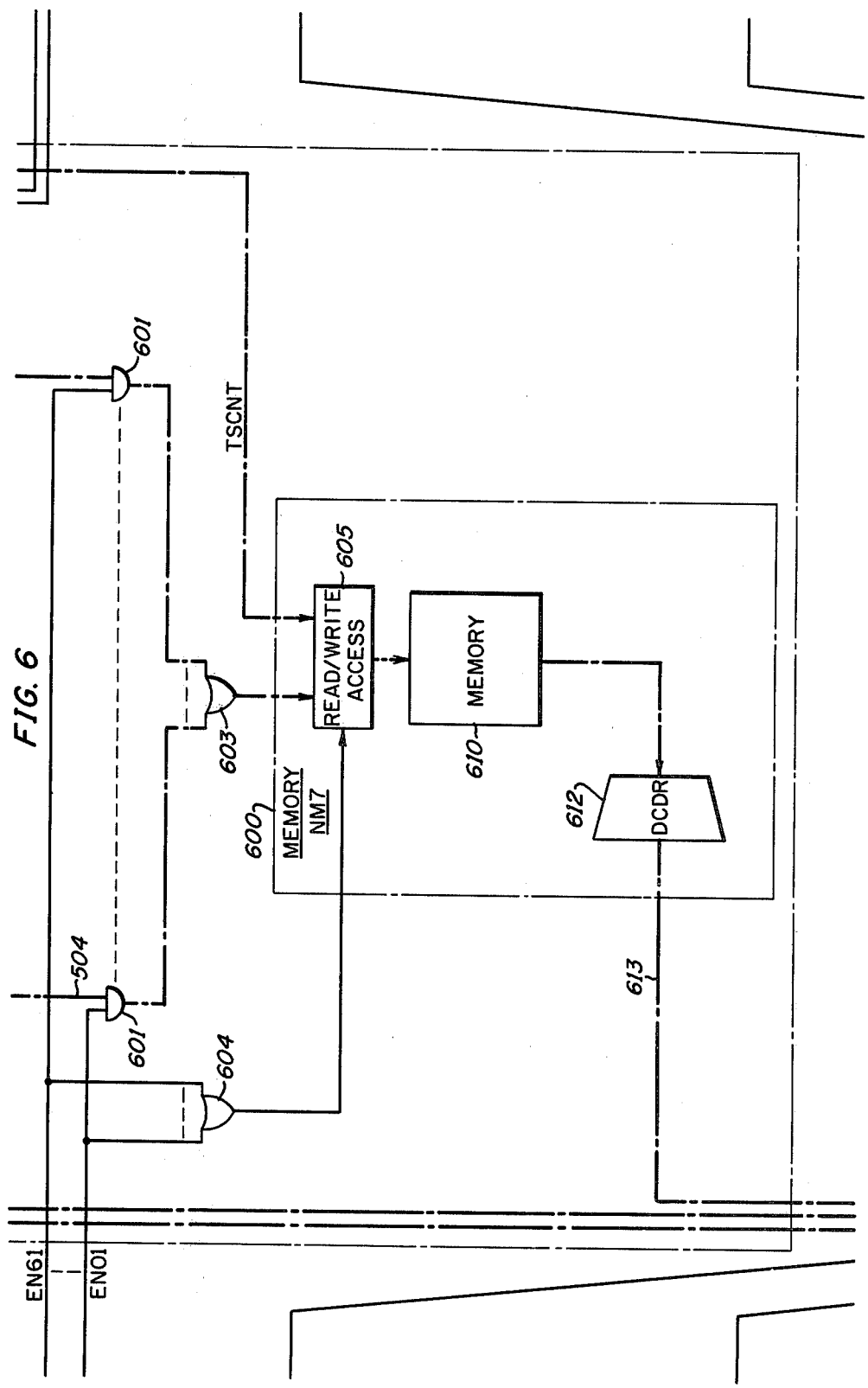

FIG. 6 shows a representation of basically an 8 by 8 switching matrix 180 having AND gates for crosspoints which are selectively activated under control of information obtained from time-slot memories 145 shown in FIGS. 5 and 6. A group of seven time-slot memories is provided, with one time-slot memory associated with each input terminal of the switch 180. For example, memory NM0 through NM6 of FIG. 5 are associated with input terminals I0 through I6 of the switch 180, respectively. Additionally, an eighth memory, memory NM7 shown in FIG. 6 in the block labeled 600, is associated with the input terminal I7 of the switch 180. The memories NM0 through NM6 depicted in FIG. 6 are identical in structure each including memory change control circuitry 500, described in the following paragraphs. For the sake of convenience, only the circuitry of memory NM0 is described. It will be understood that the circuitry of other memories, i.e., memory NM1 (not shown) through memory NM6 comprise the same structure performing equivalent functions in the same way. The memory NM0 comprises a memory unit 503 and a read/write access circuit 501 which is shown as having an input from the peripheral bus 158 and from the time-slot counter on the conductor TSCNT. The memory may be written by means of the processor from the peripheral bus by the application of a write address and data to the read/write access circuit 501 which will cause the data to be written into the memory at the specified address under the control of a pulse from the time-slot counter 131 appearing on the conductor TSCNT. As mentioned earlier, a pulse occurs on the conductor TSCNT twice in each time slot, and the read/write access circuit 501 may respond to a first pulse to write information into the memory and responsive to a second pulse to read information from the memory. Accordingly, during any time-slot period new information may be written into the memory or, if a write is not required the information in the memory will remain unchanged. The read/write access circuit will cause the memory to read its location sequentially to produce a data word on the memory output terminal 504 once every time-slot period. This information is applied to the decoder 505 where it is decoded to generate a unique output signal on cable 506 to activate AND gate 620 or one of the seven AND gates 630 connected to the cable 506. When activated, one of these AND gates will transmit a serial steam of data occurring on the conductor I0 to one of the output conductors O0 through O7.

As discussed earlier with respect to FIGS. 2 and 4, an error signal on error conductors E01, E02 through E61, E62 will result in the setting of one of the flip-flops EN0 through EN6 and an output signal on the corresponding one of the conductors EN01 through EN61. These conductors are shown in FIG. 6 to be connected to a corresponding group of AND gates 601. Each of these AND gates itself is symbolic of a plurality of AND gates. For example, the AND gate 601 to which the conductor EN01 is connected shows as another input the cable 504. The cable, in this illustrative embodiment, depicts a three-conductor cable capable of carrying a three-bit data word which may be decoded by means of the decoder 505 to produce a one-out-of-eight signal on the conductors of cable 506. A signal on the conductor EN01 will cause activation of the plurality of AND gates 601 to which this conductor is connected, causing a three-bit data word read from memory unit 503 to be gated through AND gates 601 and OR gate 603, which is symbolic of three separate OR gates having seven inputs each, to the read/write access circuit 605. In a similar manner, a signal on the conductor EN61 may be employed to gate a three-bit data word from memory NM6 to the read/write access circuit 605. The read/write access circuit 605 receives control signals from the conductor TSCNT produced by the time-slot counter 131 to write information into the memory 610 during a first portion of a time-slot period at sequential addresses of the memory upon activation by means of a signal produced by the OR gate 604. The OR gate 604 simply combines the signals on conductors EN01 through EN61 to produce an activation signal when a signal occurs on any of these conductors, i.e., when an error condition has occurred and one of the error flip-flops EN0 through EN6 has been set. As discussed earlier herein, the time-slot counter 131, is an eight-bit binary counter capable of counting to 256. When the count represented by the conductors of the cable TSCNT reaches 0, the read/write access circuit 605, when activated by means of OR gate 604, will initiate writing a data word occurring at the output of OR gate 603 into the memory at a location 0. Since the system operates on the basis of 128 time slots, a new word may be written into the next sequential location of the memory at every other advancing count of the counter 131. In this manner, a data word may be written into the memory 610 during a first half of each time slot and the read/write access circuit 605 is responsive to a time-slot counter output signal during the second half of each time slot, when activated from OR gate 604, to read a data word out of the memory 610 and apply the data word to the decoder 612.

As discussed earlier herein with respect to FIGS. 2 through 4, the occurrence of an error in one of the input time-slot interchange units causes input information to be applied to the spare input time-slot interchange unit TSI-7 and further causes this information to be applied to the conductor I7 in the proper sequence. The information appearing on conductor I7 is applied to, among others, the AND gates 631 which are activated by means of control signals occurring on the conductor 613 as generated by the decoder 612. The information which was applied to the conductor I7 by the time-slot interchange unit TSI-7 was obtained under control of signals on one of the conductors EN01 through EN61. The same signals are used in FIG. 6 to activate AND gates 601 to transfer information from the corresponding one of the network time-slot memories, memory NM0 through memory NM6, to the spare network time-slot memory, NM7. Thus, for example, an error in time-slot interchange unit TSI-0 results in the transfer of information from conductor PC-0 to input time-slot interchange unit TSI-7 and application of this information to the conductor I7 under control of time-slot information transferred from time-slot memory TSM-0 to time-slot memory TSM-7 shown in FIG. 3. Concomitantly, time-slot information is transferred from memory NM0 shown in FIG. 5 to the network time-slot memory, memory NM7, shown in FIG. 6. In this manner, information appearing on the conductor I7 is switched through the time-division switch 615 by the selective operation of AND gate 631 and is applied to one of the output conductors O0 through O6 in exactly the same fashion, and under control of the same information, as would have occurred in the absence of an error in time-slot interchange unit TSI-0. It will be appreciated that some real time is required to perform the transfer of data. However, the transfer of data is accomplished between time-slot memories simultaneously and the entire transfer of time-slot memory can take place during one time frame comprising 128 time slots. During this period of transfer certain of the information received on the conductor PCO0 may be lost. However, such information represents speech samples of 128 different telephone conversations and will go unnoticed in most telephone calls.

Figure 7:
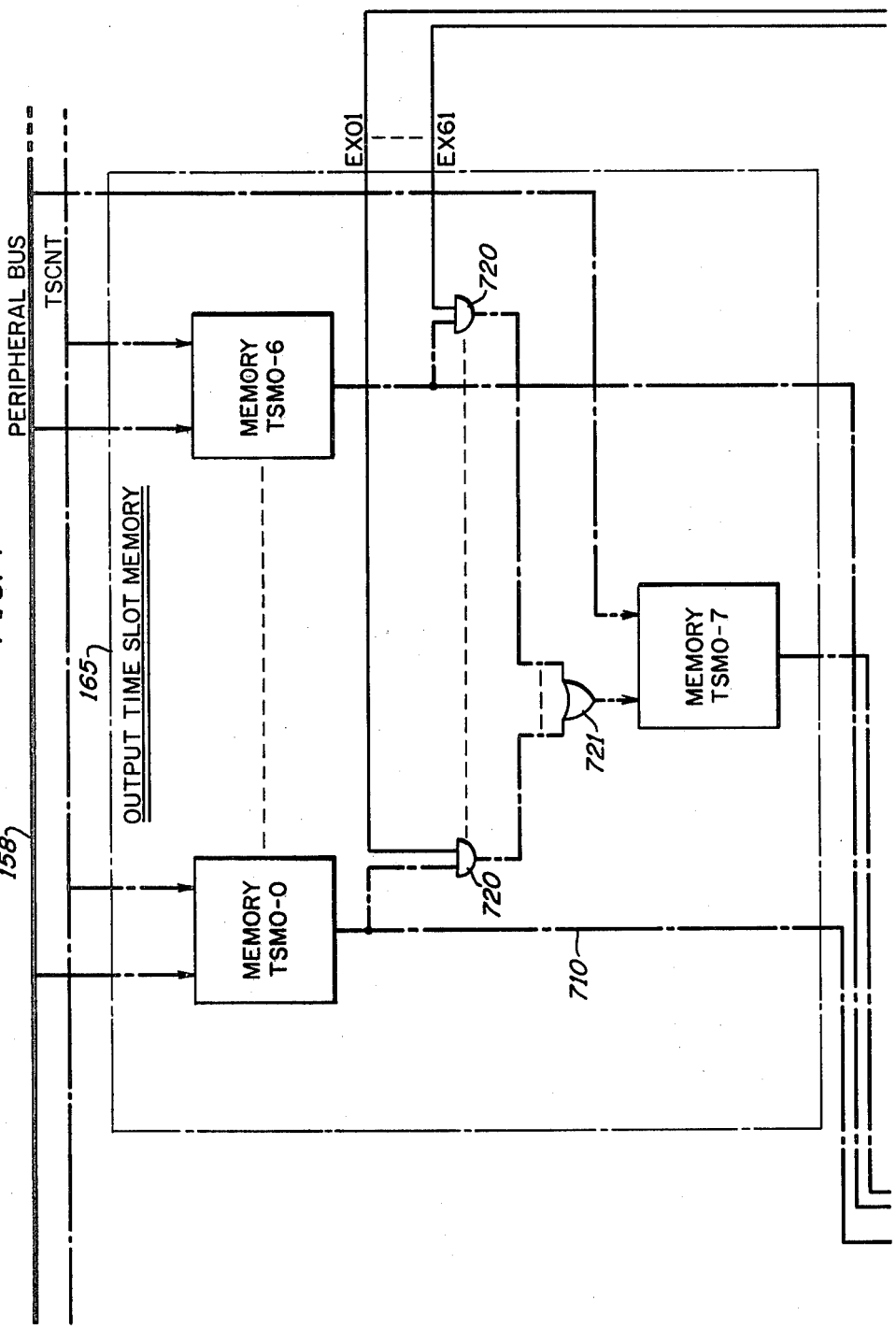
FIG. 7 shows output time-slot memories for storing information for controlling output time-slot interchange units.
Figure 8:
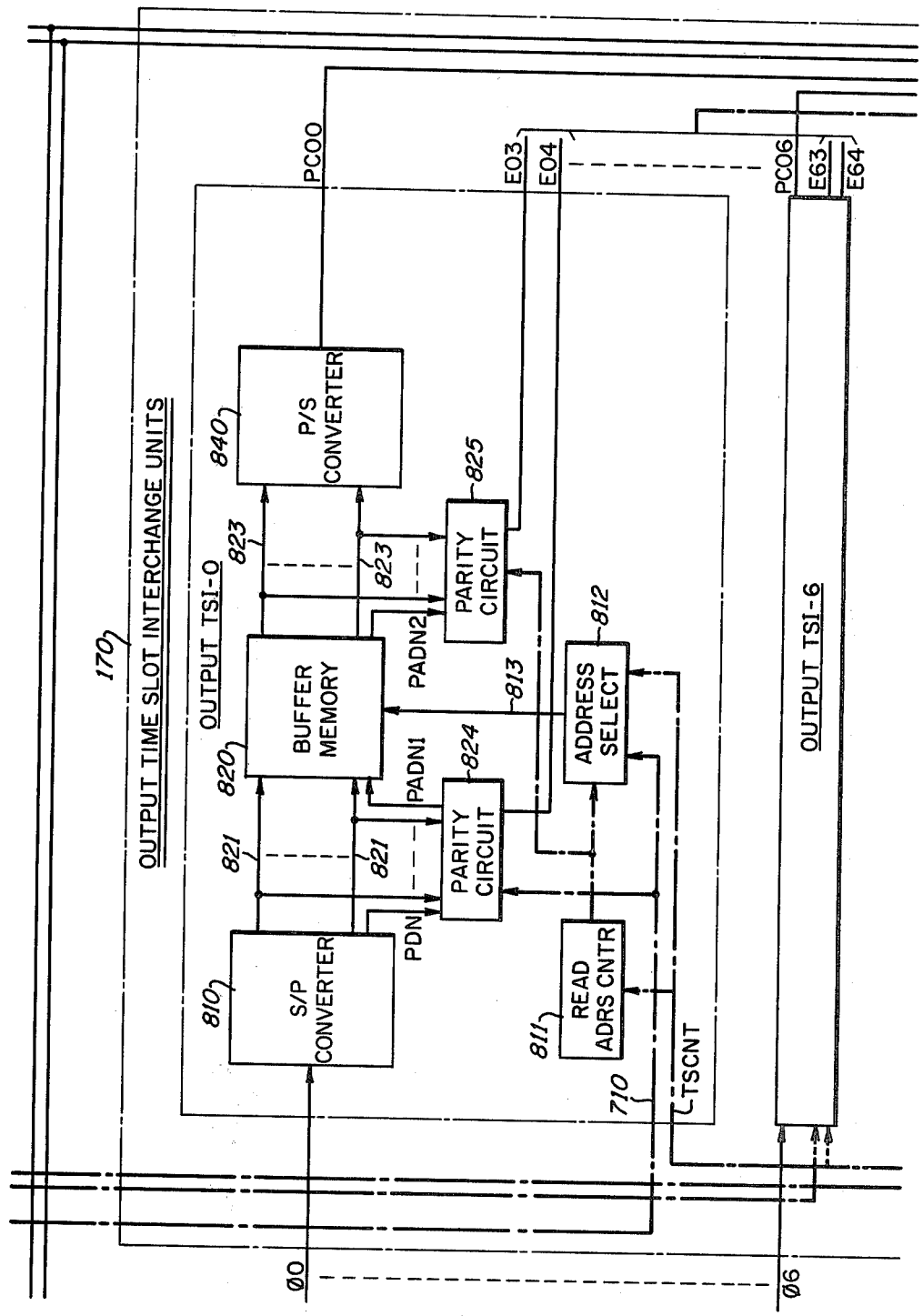
FIG. 8 depicts a group of output time-slot interchange units.
Figure 9:
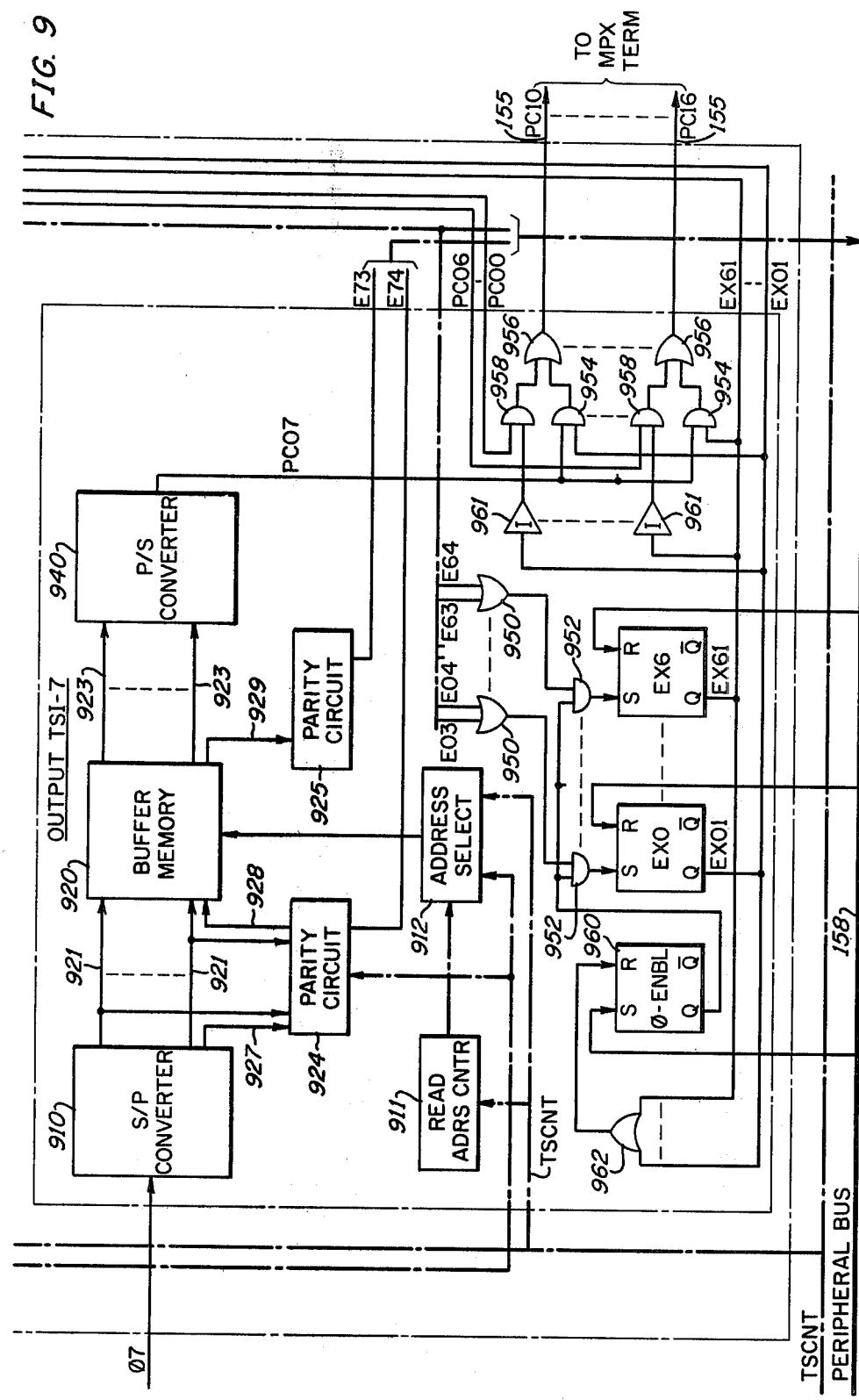
FIG. 9 shows a spare output time-slot interchange unit in accordance with the invention, including control circuitry for activating the spare unit.

The conductors O0 through O7 of FIG. 6 are connected to output time-slot interchange units shown in greater detail in FIGS. 7 through 9. In this illustrative embodiment, an output time-slot interchange unit consists of seven identical circuit arrangements referred to in FIG. 8 as TSI-0 through TSI-6 and a spare unit labeled output TSI-7. For the sake of simplicity, only one of the seven identical units will be described, namely, output TSI-0 as shown in FIG. 8. As will be apparent from the description in the foregoing paragraphs, the conductor O0 will carry a serial stream of data bits which is applied to the serial-to-parallel converter 810. This circuit converts the serial stream of data into a parallel data word comprising seven data bits which are applied to a corresponding number of conductors designated 821 in FIG. 8, and a parity bit over the data which is applied to the conductor PDN at the output of the converter 810. The seven-bit data word is applied to the buffer memory 820 via conductors 821 while write address and control signals are applied to the memory on conductor 813 from the address select circuit 812. An appropriate write address is applied to the address select circuit 812 on the cable 710 from the time-slot memory TSMO-0 which provides a new write address once during each time slot. The write address is also applied to the parity circuit 824. In this circuit, the parity bit on conductor PDN is compared with the parity computed over the data word on conductors 821 and in case an error is found an error signal is generated on the conductor E04. Additionally, parity over the write address and data word is generated and produced on the conductor PADN1 to be written in memory at the time that the write operation occurs. The address select circuit 812 operates under control of signals produced on the cable TSCNT from the time-slot counter to select a write address during a first portion of each time-slot period and a read address during a second portion of the time-slot period. A read address counter 811 is incremented once every time slot to produce a next sequential read address to be applied to the buffer memory 820, such that the contents of the memory is read therefrom and applied to the conductors 823 in the sequence in which it is stored in memory. In the reading operation, the parity information stored at the time of the writing is provided on the conductor PADN2 and the parity circuit 825 compares this parity information with the parity over the read address and data and generates an error signal on the conductors E03 in the event that an error is detected. The data word read from the buffer memory and applied to the conductors 823 in parallel, is converted in the parallel-to-serial converter 840 to produce a serial stream of data on the output conductor PC00. In a similar manner, information received from conductors O1 (not shown) through O6 may be handled by the corresponding output time-slot interchange circuits TSI-1 (not shown) through TSI-6 generating error signals and data on the corresponding error signal conductors and data conductors, respectively.

An error signal on any of the error leads E03, E04 through E63, E64 will cause a corresponding one of the flip-flops EX0 through EX6 to be set through operation of the OR gates 950 and AND gates 952. AND gates 952 have input terminals connected to an output enable flip-flop 960 to enable these gates when the flip-flop is set. It will be assumed that this flip-flop is set in the absence of errors under control of signals from the central processor transmitted via the peripheral bus which is connected to the set input of the enable flip-flop 960. When any one of the flip-flops EX0 through EX6 is set, the enable flip-flop will be reset through operation of OR gate 962 to which each of the flip-flops EX0 through EX6 are connected. The AND gates 952 will be inhibited when flip-flop 960 is reset.

A fault in any of the output time-slot interchange units, which will be evidenced by an error signal on one of the error leads E03, E04 through E63, E64 causes the faulty time-slot interchange unit be removed from the transmission path and causes the data which is switched through the network 640 must be transferred to output TSI-7. This requires a modification of the information defining operation of the gates 630 to activate one of the gates 620 thereby transferring information appearing on one of the input conductors I0 through I6 to the output conductor O7. As discussed earlier and as shown in FIGS. 5 and 6, the information of one of the time-slot memories, NM0 through NM6, controls all gates associated with a single corresponding input conductor I0 through I6 independent of the output designation. Accordingly, information in all of the memories, NM0 through memory NM6, may require modification if the spare output time-slot interchange unit is to receive all data designated for one of the other units. By way of example, assume that an error is detected in the output time-slot interchange unit TSI-0 evidenced by an error signal on one of the conductors E03 or E04. Assuming further, that there is no prior error condition in the time-slot interchange units, the enable flip-flop 960 will be set allowing the flip-flop EX0 to be set. As a result thereof, the enable flip-flop 960 will be reset through operation of OR gate 962 inhibiting further operation of AND gates 952. Further, as a result of the setting of flip-flop EX0, and by operation of the one of the inverters 961 connected to the flip-flop EX0 and the corresponding one of the AND gates 958, the flow of information from TSI-0 on conductor PC00 will be inhibited. At the same time, enablement of the one of the AND gates 954 connected to the flip-flop EX0 and operation of the corresponding one of the OR gates 956, information appearing on the conductor PC07 will be transferred to the output conductor PC10 which is connected to the multiplex terminal 153 as one of the conductors 155 shown in FIG. 1.

Output conductors EX01 through EX61 of the flip-flops EX0 through EX6, respectively, are connected to each of the network time-slot memory circuits, NM0 through NM6, each including a memory change control circuit 500, as shown in FIG. 5. Memory NM0 is representative of the network time-slot memories. As mentioned earlier, the memory unit 503 contains 128 three-bit words which define which one of the gates 630 of the switch 180 connected to conductor I0 is to be activated. In the case of the example mentioned in the prior paragraph wherein an error has been detected in output time-slot interchange unit TSI-0, all seven of the AND gates 630 connected to the output conductor O0 must be disabled and in their stead a corresponding ones of the AND gates 620 connected to output conductor O7 must be selectively activated. To accomplish this, every code in the memory which designates output time-slot interchange unit 0, e.g., 000, must be modified to designate output time-slot interchange unit 7, e.g., 111. The output conductors EX01 through EX61 of the error flip-flops EX0 through EX6, respectively, are connected to an encoder 520 which produces a three-bit binary data word representing the decimal values 0 through 6. In the case of the example under discussion, the decoder will produce a binary word 000 to be stored in the compare word register 522. As mentioned earlier, the network time-slot memory 503 is read at sequential locations under control of a clock pulse in such a manner that each location will be read during each time frame having 128 time slots. Each data word, as it is read from the memory 503, is applied to the comparator 524 and in the event of a match between the word read from the memory 503 and from the compare word register 522 (e.g., 000) an output signal is generated by the comparator at the AND gates 525. One of these AND gates, e.g., the one connected to conductor EX01, will be enabled and one of the adder circuits 527, e.g., the one labeled "add 7", will be enabled. This circuit is envisioned to be a standard adder circuit which will add the decimal number 7 to the data appearing on the cable 504, e.g., 000, to produce a data word, i.e., 111. This data word will be applied to what is identified as an OR circuit 528 which will apply the data word and an appropriate memory write enable signal to the read/write access circuit 501 for entry into the memory under control of clock pulse in a time period immediately succeeding the read access time period, as has been explained earlier herein. Alternatively, a circuit for producing the data word 111 in response to a signal from the comparator 524, may be used instead of AND gates 525, adders 527, and OR circuit 528.

It will be apparent from the drawing that in the circuitry of FIG. 5, a binary word equivalent to decimal numbers between 1 and 7 will be added to words read from memory having decimal values between 0 and 6, depending upon the states of the conductors EX01 through EX61, such that a data word having the decimal value of 7 is produced to replace the number of the faulty time-slot interchange unit as indicated by the states of the conductors EX01 through EX61. As is apparent from the foregoing description, the memory update operation is carried out autonomously and the same sequence of operation takes place in each of the network time-slot memory circuits, NM0 through NM6. In this manner, all of the memories are updated in a time period equivalent to one cycle having 128 time slots in this illustrative example. The advantages of the autonomous operation are immediately apparent since the memory may be updated and to accomplish the switch from a faulty time-slot interchange to the spare time-slot interchange within one cycle, not taking into consideration delays introduced by the electronic circuitry in activating the comparator circuit and the like, which will be minimal compared to the time of one cycle. Furthermore, at worst, data switched through the network during one frame may be lost in part or in its entirety. However, such data represents a single coded element of each of a large number of simultaneous telephone conversations and will not be noted in any normal conversation.

The above-described arrangement is intended to be merely an illustrative application of the principles of this invention; numerous other arrangements may be devised by those skilled in the art without departing from the spirit and scope of the invention.

We claim:

1. A communications switching system comprising a switching network, a group of line interface units connected to said network, a corresponding group of communication lines connected to said interface units, a plurality of time-slot memories associated with said line interface units for controlling the transfer of data through said line interface units, and error detection circuits for detecting faults in said line interface units and for generating error signals indicative of a fault in an identifiable interface unit of said group of units;

CHARACTERIZED IN THAT said system comprises a spare interface unit connected to all lines of said group of lines, a time-slot memory associated with said spare interface unit for controlling the transfer of data through said spare interface unit, and circuit means responsive to said error signals for transferring data between said spare unit and a line connected to a unit of said group of units identified by said error signals and for transferring information from a time-slot memory associated with the interface unit identified by said error signals to the time-slot memory associated with said spare line interface unit.

2. A communication switching system in accordance with claim 1

CHARACTERIZED IN THAT said circuit means responsive to said error signals comprises error flip-flops for storing error indications and gate means responsive to said flip-flops for selective gating information from said lines to said spare interface unit and for transferring data from said time-slot memories associated with the line interface units of said group of units to said time-slot memory associated with said spare unit.

3. A communication switching system in accordance with claim 1 wherein said system further comprises a clock circuit which produces a series of sequential clock pulses each defining a time slot in each system time cycle comprising a predetermined number of time slots equal in number to the number of address locations of said time-slot memories of said interface units, and wherein said time-slot memories of said interface units are connected to said clock circuit and are adapted to perform at least one memory operation in each time slot

CHARACTERIZED IN THAT said circuit responsive to error signals is adapted to transfer the entire contents of a time-slot memory of an interface unit identified by said error signals to the time-slot memory of said spare unit within one system time cycle.

4. A communication switching system in accordance with claim 1 wherein said system comprises time-slot memories for storing information defining connections in said network for establishing paths between line interface units;

CHARACTERIZED IN THAT said circuit means is responsive to said error control signals to modify the contents of said network control memories to connect to said spare interface unit in place of an interface unit identified by said error signals.

5. A communication switching system in accordance with claim 4

CHARACTERIZED IN THAT said circuit means responsive to said error signals comprise circuits for comparing contents of address locations of said network memories with data corresponding to an interface unit identified by said error signals and for writing data corresponding to said spare interface unit in any location containing data corresponding to said unit identified by said error signals.

6. A communication switching system in accordance with claim 1 wherein said switching network comprises input terminals and output terminals and said group of line interface units comprises a group of input interface units and a group of output interface units and wherein one input interface unit is associated with each input terminal of said network and one output interface unit is associated with each output terminal of said network and said system comprises a network time-slot memory corresponding to each network input terminal for storing information defining a connection from the associated network input terminal to a selected network output terminal;

CHARACTERIZED IN THAT said spare line interface unit comprises an input section and an output section and said switching network comprises a spare input terminal connected to said input section of said spare interface unit and an output terminal connected to said output section of said spare interface unit and said network further comprises a time-slot memory associated with said spare input terminal for storing information defining connections from said spare input terminal to selected output terminals; and said circuit means responsive to said error signals is adapted to transfer information from a network time-slot memory associated with a network input terminal connected to an interface unit identified by said error signals, to said time-slot memory associated with said spare network input terminal.

7. A communication switching system in accordance with claim 6

CHARACTERIZED IN THAT said circuit means responsive to error signals is adapted to transfer information from a time-slot memory associated with the output section of an interface unit identified by said error signals to the time-slot memory of the output section of said spare interface unit and further comprises a memory change circuit adapted to alter the contents of all network time-slot memories to define said spare network output terminal in each memory word defining the output terminal connected to the line interface unit identified by said error signals.

8. A communication switching system in accordance with claim 7

CHARACTERIZED IN THAT said memory change circuit comprises an adder circuit adapted to add to the information defining output terminals a value equal to the difference between the value of the designation of an output interface unit identified by said error signals and the value of the designation of said spare output interface unit.

9. A communication switching system in accordance with claim 8 wherein said system further comprises a clock circuit which produces a series of sequential clock pulses each defining a time slot in each system time cycle comprising a predetermined number of time slots equal in number to the number of address locations of said network time-slot memories and wherein said network time-slot memories are connected to said clock circuit and are adapted to perform at least one memory operation in each time slot

CHARACTERIZED IN THAT said memory change circuit is adapted to alter the entire contents of all network time-slot memories within one system time cycle.

* * * * *